Patented Feb. 27, 1945

2,370,177

UNITED STATES PATENT OFFICE 2,370,177

PRODUCTION OF SUBSTANCES RICH IN RIBOFLAVIN

David A. Legg and Samuel C. Beesch, Philadelphia, Pa., assignors to Publicker Commercial Alcohol Company, Philadelphia, Pa., a corporation of Pennsylvania No Drawing. Application September 3, 1941, Serial No. 409,378

11 Claims. (Cl. 195—42)

The present invention relates to the production of high-vitamin-content concentrates from bacterial fermentations and it relates more particularly to the production of concentrate having a high riboflavin-content from butanol-acetone fermentations.

An object of the present invention is to provide a fermentation-residue concentrate from butanol-acetone fermentation which has a high riboflavin-content.

Another object of the present invention is to provide a method for producing high riboflavin-content concentrate from butanol-acetone fermentation.

Still another object of the present invention is to provide a method of fermenting mash by means of butanol and acetone producing bacteria which will give a fermentation residue having a high riboflavin-content.

Other objects and purposes of the present invention are apparent in the following specification and appended claims.

It has long been known that the residue obtained from the fermentation of a starch- or sugar-containing mash by butanol-and-acetone-producing bacteria contains beneficial substances which make it particularly suitable for feeding purposes.

Thus, United States Patent No. 1,587,101 to Woolner described the salvaging of this fermentation "slop" or residue and the concentration and drying thereof for use as stock feed.

Nelson, Heller & Fulmer writing in the Journal of Industrial & Engineering Chemistry (February 1925, page 199 et seq.) determined the vitamin B content of molasses.

Booher writing in the Journal of the American Medical Association (volume 110, No. 4, page 1105) describes early work on riboflavin as obtained from various enzymatic processes.

Pett writing in the Biochemical Journal (volume 29, 1935, page 937) describes the bacterial production of riboflavin (employing the synonymous term lactoflavin).

For the past five years or more, it has been well known in the art of butanol-acetone fermentations that the fermentation residue and the final concentrate obtained by evaporating, drying and grinding said residue, has a higher riboflavin content than can be accounted for by the content of the original mash or substrate.

However, one of the drawbacks to the commercial production of high riboflavin-content concentrates from such fermentations, was the fact that the riboflavin-content of the final concentrate varied considerably from batch to batch.

We have found that the riboflavin-content of the fermentation residue and of the final dried concentrate can be increased and made more uniform by modifying the fermentation as will be hereinafter described.

The present invention is preferably directed to the fermentation of starchy or cereal mashes by bacteria which will be referred to as Clostridium acetobutylicum. The name Clostridium acetobutylicum as employed in the specification and claims is not intended to designate any single organism, but is used to identify the group of organisms which are proteolytic in character and are capable of breaking down the proteins to form compounds having amino groups and which are capable of fermenting fermentable solutions to produce butanol and acetone as defined in United States Patent No. 1,911,411 to Viljoen.

We have found that the addition to cereal or starchy mashes (either before or after sterilization thereof) of any compound which, in aqueous solution liberates a sulphite ion, greatly improves the riboflavin-content of the dried fermentation residue and makes the riboflavin-content of successful fermentation residues more uniform.

We have found that the amounts of the sulphite-liberating material to be added are limited by the toxicity of the sulphite ion or of the positive ion to the organism under conditions of fermentation.

As used in the specification, the expressions "cereal" or "starchy" mashes indicate aqueous suspensions of such cereals as rice or corn which have been cooked to gelatinize the starch but which have not been saccharified to any appreciable extent, although it has been found that a small amount of sugar may be present without interfering with results.

Riboflavin-contents are expressed in terms of "gamma"; a "gamma" being defined as one micro-gram of riboflavin per gram of substance.

The dry matter making up the cereal or starchy mashes employed usually assays less than 10 gamma of riboflavin before fermentation.

We have found that the addition, for example, of sodium sulphite is particularly effective in increasing and making more uniform the riboflavin-content of the dried fermentation residue.

In the case of sodium sulphite, which we prefer to use, the effective percentage in a mash having 4 to 10% of cereal lies between the more or less approximate limits of 0.005% to 0.05% of the anhydrous salt. The preferred amount of sodium sulphite is between the more or less approximate limitation of 0.014 to 0.035 gram per 100 cc. of fermentation mash.

We have found that amounts of sodium sulphite below this range may not be fully effective while amounts above this range may be too inhibitory to fermentation.

The amounts of other compounds containing the sulphite ion may be based on the percent of $SO_3$ and we have successfully used such compounds as potassium sulphite, sodium hydrogen sulphite, barium sulphite, sodium thiosulphate, ethyl sulphite, ammonium sulphite, and potassium pyro sulphite.

We prefer to add the sulphite to the cereal or starchy mash before sterilization thereof although it may be added after sterilization or during the first few hours of fermentation.

The following are examples of how our present invention may be practiced:

EXAMPLE I

INFLUENCE OF SODIUM SULPHITE ON RIBOFLAVIN PRODUCTION FROM RICE MASH FERMENTATION

A mash was made up containing 5 grams of polished rice and 0.043 gram of sodium sulphite per 100 cc. The mash containing the sulphite was sterilized for 1½ hours at 15 pounds of steam pressure in an autoclave. A similar control mash was made up without the sulphite. The flasks of mash were fermented under identical conditions by a strain of *Clostridium acetobutylicum* for 66 hours at 37° C. The decanted liquor from the fermentation mash was evaporated to dryness in vacuo at temperatures not exceeding 100° C. The dried residue from the mash which had been treated with sulphite assayed 1800 gamma of riboflavin while the residue from the control mash (which contained no sulphite) assayed 375 gamma of riboflavin. In another similar experiment, the results shown in Table I were obtained:

Table I

| Percent of sodium sulphite | Riboflavin (micrograms per gram of dried fermentation residue) |
|---|---|
| None | 580 |
| 0.014 | 1,550 |
| 0.030 | 1,400 |
| 0.043 | 1,030 |

Thus, the results set forth in Table I would seem to indicate that the optimum concentration of sodium sulphite lies somewhere between 0.014% and 0.03% of the fermentation mash.

EXAMPLE II

INFLUENCE OF SODIUM SULPHITE WHEN ADDED AT THE TIME OF INOCULATION AND WHEN ADDED 24 HOURS AFTER THE FERMENTATION HAD BEGUN

Flasks of sterile mash containing 2.5% of polished rice and 2.5% of corn were made up and various amounts of sterile sodium sulphite were added to some of them at the start of fermentation and to others 24 hours later. The flasks were inoculated with a culture of *Clostridium acetobutylicum* and incubated for 70 hours at 37° C. The clear layer of fermented mash was evaporated to dryness in vacuo and the residue assayed for riboflavin with the results shown in Table II.

Table II

| | Medium | Percent of sodium sulphite in mash | Riboflavin micrograms per gram of dried fermentation residue |
|---|---|---|---|
| A | 2.5% corn, 2.5% rice | None | 1,230 |
| B | do | 0.014% added at start | 1,980 |
| C | do | 0.007% added at start | 1,440 |
| D | do | 0.014% added 24 hrs. from start | 1,280 |
| E | do | 0.007% added 24 hrs. from start | 1,090 |

From the results shown in Table II it would seem that the addition of sodium sulphite at the beginning of fermentation is more effective than the addition after the fermentation has progressed for 24 hours and that such addition should be made either before the start of the fermentation or at some time earlier than 24 hours after the fermentation has set in. These experiments also indicate that 0.014% of sodium sulphite is more effective than 0.007%.

EXAMPLE III

INFLUENCE OF SULPHITE ION IN FORMS OTHER THAN SODIUM SULPHITE

Flasks of 5% cereal mash were made up with various amounts of sulphites and allied compounds. These mashes contained 2.5% rice and 2.5% corn and were sterilized for 1½ hours at 15 pounds of steam pressure. After 72 hours fermentation at 37° C. by a strain of *Clostridium acetobutylicum*, the settled clear liquor was evaporated in vacuo to dryness and the residue assayed for riboflavin. The average result of three flasks under each condition is shown in Table III.

Table III

| | Medium | $SO_3$ compound added | Riboflavin micrograms per gram of dried fermentation residue |
|---|---|---|---|
| A | 2.5% rice, 2.5% corn | None (control) | 1,180 |
| B | do | 0.014% $Na_2SO_3$ | 1,860 |
| C | do | 0.011% $NaHSO_3$ | 1,580 |
| D | do | 0.03% $Na_2S_2O_3$ | 1,230 |
| E | do | 0.02% ethyl sulphite | 1,550 |

The results shown in Table III would seem to indicate that sodium sulphite is the most effective and that sodium thiosulphate is the least effective of the sources of sulphite ion.

EXAMPLE IV

INFLUENCE OF SULPHITE IN FORMS OTHER THAN SODIUM SULPHITE

In an experiment similar to that of Example III further comparison was made between sodium sulphite and other compounds containing a sulphite ion with the results shown in Table IV.

Table IV

| | Medium | Forms and amount of SO₂ compound | Riboflavin micrograms per gram of dried fermentation residue |
|---|---|---|---|
| A | 2.5% corn, 2.5% rice | None (control) | 870 |
| B | ---do--- | 0.02% barium sulphite | 1,200 |
| C | ---do--- | 0.02% potassium sulphite | 1,320 |
| D | ---do--- | 0.02% potassium pyrosulphite | 1,320 |
| E | ---do--- | 0.02% ammonium sulphite | 1,280 |
| F | ---do--- | 0.02% sodium sulphite (control) | 1,560 |

EXAMPLE V

INFLUENCE OF SULPHITE ION WHERE THE FERMENTATION MASH UNTREATED GIVES A MAXIMUM YIELD

Rice-corn mash of suitable composition will without addition of sulphites, give a fermentation residue assaying from 350 to 2000 gamma. The influence of sulphite appears to assure an average yield closer to 2000 rather than to raise the yield appreciably above the otherwise-obtained maximum of 2000 gamma. In this experiment mashes of 2.5% rice and 2.5% corn with and without sulphite were fermented for 66 hours at 37° C. with a strain of *Clostridium acetobutylicum* with the results shown in Table V.

Table V

| Medium | Sulphite as per cent in mash | Riboflavin micrograms per gram of dried fermentation residue |
|---|---|---|
| 2.5% rice, 2.5% corn | Nil (control) | 2,050 |
| Do | 0.02% potassium sulphite | 1,980 |
| Do | 0.02% sodium sulphite | 2,180 |

While certain specific embodiments of the present invention have been described hereinabove, such embodiments are illustrative and not restrictive and the present invention may be embodied in other specific forms without departing from the spirit or essential attributes thereof. It is therefore desired that references be had to the appended claims rather than to the foregoing description to indicate the scope of the present invention.

Having thus described our invention, we hereby claim and desire to secure by Letters Patent the following:

1. A process for producing substances having generally uniform relatively high riboflavin content which comprises preparing an aqueous cereal-containing mash containing a small amount of a substance capable of liberating sulphite radical in the presence of water and fermenting the mash with *Clostridium acetobutylicum*.

2. A process for producing substances having generally uniform relatively high riboflavin content including the step of fermenting an aqueous cereal mash with *Clostridium acetobutylicum* in the presence of a small amount of a substance capable of liberating sulphite radical in the presence of water.

3. A process for producing substances having generally uniform relatively high riboflavin content including the step of fermenting an aqueous cereal mash with *Clostridium acetobutylicum* in the presence of 0.005 to 0.05% of a substance capable of liberating sulphite radical in the presence of water.

4. A process for producing substances having generally uniform relatively high riboflavin content including the step of fermenting an aqueous cereal mash with *Clostridium acetobutylicum* in the presence of 0.014 to 0.035% of a substance capable of liberating sulphite radical in the presence of water.

5. A process for producing substances having generally uniform relatively high riboflavin content which comprises fermenting an aqueous cereal mash with *Clostridium acetobutylicum* and adding to the mash within 24 hours of the start of fermentation a small amount of a substance capable of liberating sulphite radical in the presence of water.

6. A process for producing substances having generally uniform relatively high riboflavin content including the steps of fermenting an aqueous cereal mash with *Clostridium acetobutylicum* in the presence of a small amount of a substance capable of liberating sulphite radical in the presence of water and recovering concentrates rich in riboflavin from the fermentation residue.

7. A process for producing substances having generally uniform relatively high riboflavin content including the steps of fermenting an aqueous cereal mash with *Clostridium acetobutylicum* in the presence of a small amount of a substance capable of liberating sulphite radical in the presence of water, distilling off volatile fermentation products, and concentrating and drying the fermentation slop, thereby to produce a concentrate rich in riboflavin.

8. A process for producing substances having generally uniform relatively high riboflavin content which comprises preparing an aqueous mash having generally equal parts of corn and rice, adding 0.005% to 0.05% of a substance capable of liberating sulphite radical in the presence of water, and fermenting the mash with *Clostridium acetobutylicum*.

9. A process for producing substances having generally uniform relatively high riboflavin content including the step of fermenting an aqueous cereal mash with *Clostridium acetobutylicum* in the presence of a small amount of pyrosulphite.

10. A process for producing substances having generally uniform relatively high riboflavin content including the step of fermenting an aqueous cereal mash with *Clostridium acetobutylicum* in the presence of a small amount of ethyl sulphite.

11. A process for producing substances having generally uniform relatively high riboflavin content including the step of fermenting an aqueous cereal mash with *Clostridium acetobutylicum* in the presence of a small amount of sodium sulphite.

DAVID A. LEGG.
SAMUEL C. BEESCH.